DATA SIGNAL DISTORTING GENERATOR

Filed June 24, 1966 2 Sheets-Sheet 1

INVENTORS P. ELVIS
G. P. HOUCKE
BY R C Lipton
ATTORNEY

DATA SIGNAL DISTORTING GENERATOR

United States Patent Office 3,526,713
Patented Sept. 1, 1970

3,526,713
DATA SIGNAL DISTORTING GENERATOR

Peter Elvis, South Ozone Park, N.Y., and George P. Houcke, Tenafly, N.J., assignors to Bell Telephone Laboratories, Incorporated, Murray Hill and Berkeley Heights, N.J., a corporation of New York Filed June 24, 1966, Ser. No. 560,135
U.S. Cl. 178—69 5 Claims

ABSTRACT OF THE DISCLOSURE

Successive transitions of the elements of a data character are alternately advanced and delayed (or delayed and advanced) with respect to the start element to thereby widen or narrow the element pulse. The distorting set repeats each start pulse transition after a one-unit increment delay and repeats each subsequent transition in the character after, alternatively, no delay or a two-unit increment delay.

Figure 1:
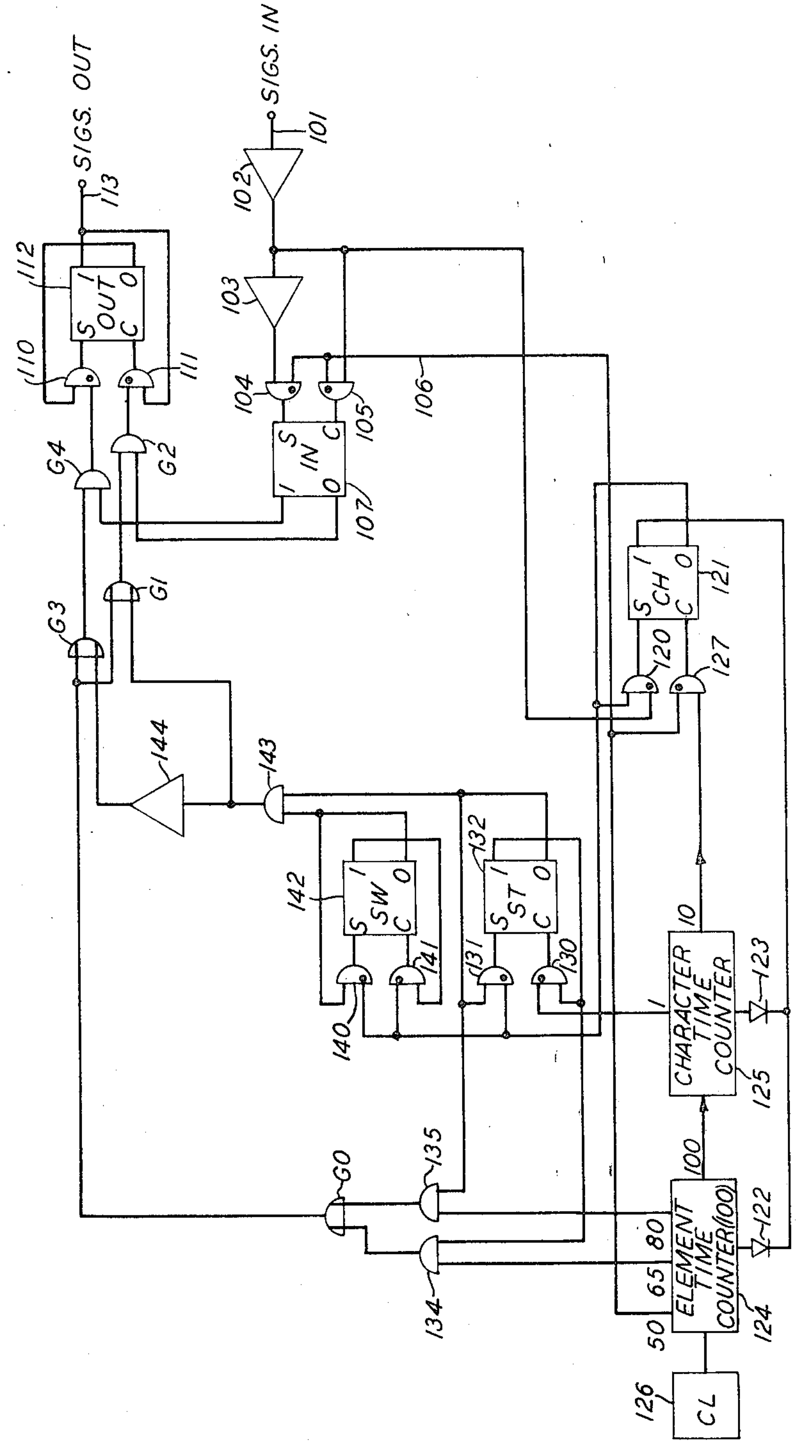

This invention relates to a data signal distorting set and more particularly to a generator for distorting data signals by delaying alternative transitions of the signal elements.

It is a broad object of this invention to provide delay distortion of data signal elements.

All transmission facilities delay signals transmitted therethrough. Distortion occurs when the delay varies from signal element to signal element. Two major types of distortion are bias and end distortion. With respect to start-stop data characters, bias involves distortion of the leading edge of the mark elements and end distortion involves distortion of the trailing edge of the marks. Bias, in turn, may comprise marking or spacing bias, marking bias occurring when the leading edge is delayed less than the start element and is therefore advanced, and spacing bias occurring when the leading edge is delayed more than the start element and is therefore retarded in phase with respect thereto. Similarly, end distortion comprises marking end distortion when the trailing edge is retarded and spacing end distortion when the trailing edge is advanced with respect to the start element.

To test the range of data receivers, generators of predistorted signals are used to simulate the delay of transmission facilities. These generators provide the various types of distortion by alternatively delaying the start element or the subsequent transitions of the data character. For example, spacing bias is provided by delaying the leading edge of the pulse while marking bias is provided by delaying the start element of the character and permitting the leading edge to be generated without delay. The amount of the distortion can be controlled by varying this delay.

Signals sent through certain transmission facilities sometimes have several types of distortion simultaneously. The distortion generator preferably should also generate different types of distortion. One method for generating different types is to delay alternate start elements so that successive characters can contain the various distortion types. In addition, leading and trailing edges may be delayed to provide spacing bias and marking end distortion in the same character, or alternatively leading and trailing edges may be advanced to provide marking bias and spacing end distortion.

One distortion encountered on transmission facilities involves pulse narrowing wherein the leading edge is delayed (spacing bias) and the trailing edge is advanced (spacing end distortion), or pulse widening wherein the leading edge is advanced (marking bias) and the trailing edge is delayed (marking end distortion). Prior distortion generator sets, however, do not simultaneously provide relative advance and retarding of transitions of the same pulse, since the former requires delay of the start element and the latter requires delay of the subsequent transition.

Accordingly, it is an object of this invention to provide a distortion generator set which advances the relative delay of one transition of a pulse and retards the other.

It is another object of this invention to generate predistorted start-stop characters having concurrent spacing bias and spacing end distortion or alternatively marking bias and marking end distortion.

In accordance with an illustrative embodiment of this invention, the generator advantageously delays each start element transition a single incremental delay interval. Subsequent transitions in the character are then passed without delay or with a double incremental delay (twice the duration of the single incremental delay) whereby they are advanced or retarded in phase with respect to the start transition. The generator provides two combinations of distortion, one combination for each of the successive characters. During the generation of one character the leading edge of mark pulses is generated without delay and the trailing edge with a two incremental delay, the pulse having marking bias and marking end distortion and is therefore widened. For the alternate character, the leading edge of mark pulses is generated with the two incremental delay and the trailing edge with no delay, the pulse having spacing bias and spacing end distortion and is therefore narrowed.

Figure 2:
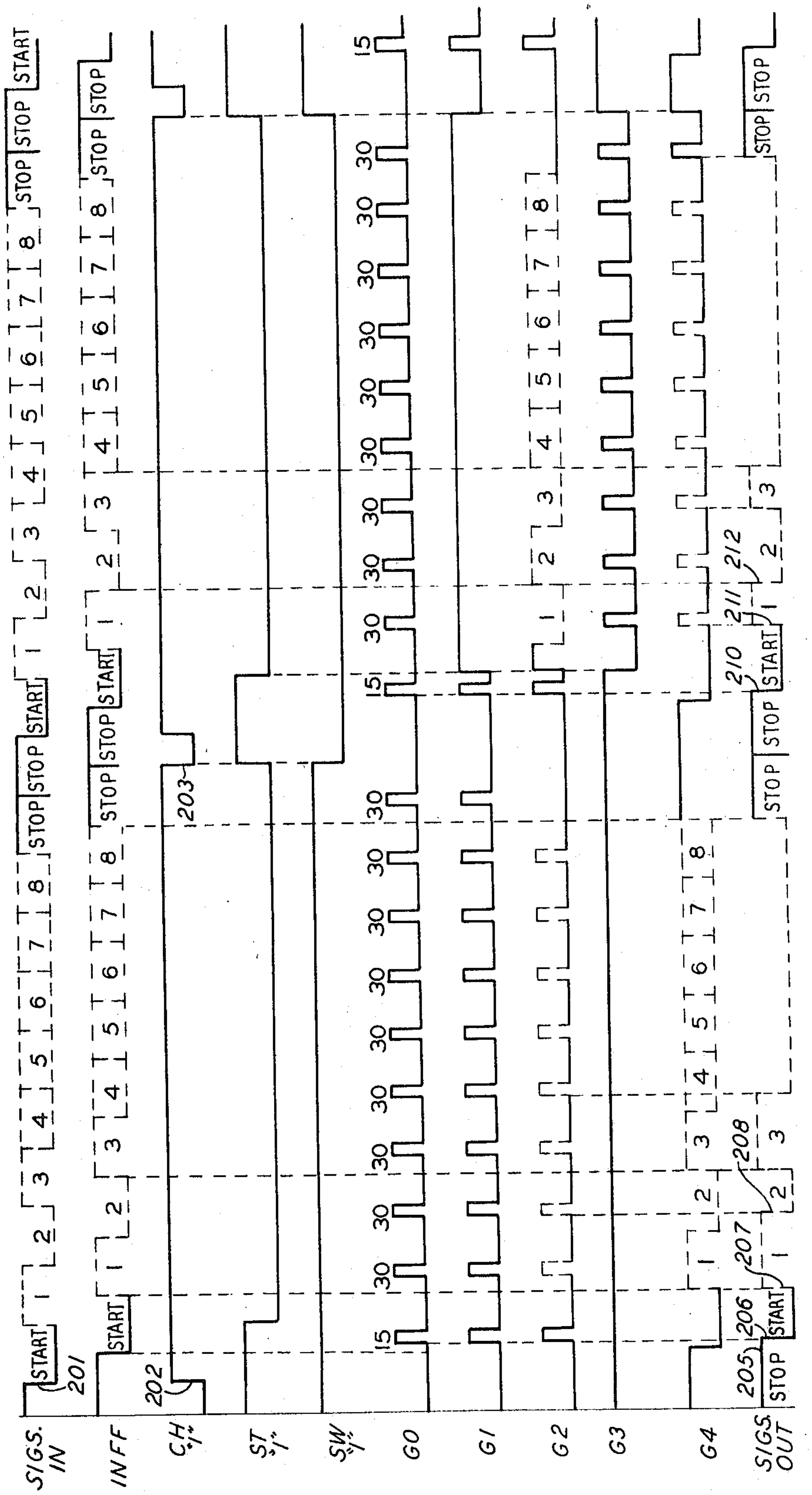

The foregoing objects and features of this invention will be more fully understood from the following description of an illustrative embodiment thereof taken in conjunction with the following drawing wherein:

FIG. 1 shows in schematic form the delays of a data signal distorting set for generating wide and narrow pulse delay distortion in accordance with this invention; and FIG. 2 depicts the output wave forms of significant components of the distortion generating set shown in FIG. 1.

The incoming undistorted start-stop signals appear on incoming line 101. The signals may comprise, for example, start-stop characters containing eleven elements. The first element of each character is invariably a start bit having a spacing condition. The next eight elements are variable mark and space information bits. The concluding two elements are marking stop bits. The normal idle condition of the line is marking.

Incoming signals on lead 101 are inverted by inverters 102 and 103 and applied double rail to gates 104 and 105. As described hereinafter, gates 104 and 105, under control of element timer 124, examines the theoretical midpoint of each signal element and the incoming element, as scanned, is stored in IN flip-flop 107. The signals stored in IN flip-flop 107 are then read out by way of distortion gates G2 and G4. Distortion gates G2 and G4 insert delay to the signals to provide, in accordance with the invention, the wide and narrow pulse distortion of the signal elements. The distorted signals at the outputs of gates G2 and G4 are passed by gates 110 and 111 to OUT flip-flop 112. The signals stored in OUT flip-flop 112 are then passed to output lead 113.

Character and element timing are provided by clock 126, element time counter 124, character time counter 125, and CH flip-flop 121. Clock 126 provides clock pulses at the output thereof which are one hundred times the signaling frequency of the incoming start-stop signals. Accordingly, clock 126 generates one hundred pulses during each signal element interval.

Element time counter 124 comprises a multistage binary counter which is advanced by the clock pulses and which recycles after attaining the count of one hundred, thereby having a cycling period equal to a signal element duration. Element time counter 124 includes four output terminals designated 50, 65, 80, and 100. Counter output terminal 50 provides the scanning pulse for gates 104 and 105 when counter 124 advances to the count of 50. Counter output terminals 65 and 80 provide appropriate delays utilized by gates G2 and G4 to distort the signals, as described hereinafter, when counter 124 advances to the counts of 65 and 80, respectively. Output terminal 100 provides an advance pulse for character time counter 125 when counter 124 advances to count 100.

Character time counter 125 provides the count of signal elements since it is advanced each time counter 124 recycles. As described hereinafter, character time counter 125 will advance to the count of one at the termination of the start pulse of the incoming signal, providing an enabling pulse to its 1 output terminal. Character time counter 125 continues to advance at the end of each incoming element until it attains the count of ten at the termination of the first stop element whereupon an enabling pulse is provided to the 10 output terminal of counter 125. The functions of these output pulses will be described hereinafter.

CH flip-flop 121 cycles for each incoming character, being set by the incoming start element and cleared under the joint control of element time counter 124 and character time counter 125 in the middle of the last stop element, as described in detail hereinafter. The functions of CH flip-flop 121 comprise disabling counters 124 and 125 and resetting them at the termination of each incoming character and enabling them to advance upon the reception of each incoming start element so that the counters start their cycles in phase with the incoming signals. In addition, CH flip-flop 121 also controls the operation of ST flip-flop 132 and SW flip-flop 142, which flip-flops are described below.

As previously described, the pulse distortion of the incoming signals is inserted by gates G2 and G4. The particular pattern of the delay distortion is provided by ST flip-flops 132 and SW flip-flop 142, and by gates G0, G1, and G3.

ST flip-flop 132 cycles for each incoming start-stop character, being cleared by the 1 output terminal of character time counter 125 at the end of each incoming start signal and being set by CH flip-flop 121 in the middle of the final stop signal. As described in detail hereinafter, the function of ST flip-flop 132 is to divide each character into two parts comprising the start element and the remaining element portion so that different delay distortion may be inserted for different parts of the character.

Gate G0, together with gates 134 and 135, provide the specific delay intervals for the distortion to be inserted by gates G2 and G4. Gate G0 is jointly controlled by terminals 65 and 80 of element time counter 124 and ST flip-flop 132 to pass a 15 percent element incremental delay pulse during each start element and a 30 percent element incremental delay pulse during the succeeding elements of the start-stop character as described hereinafter.

SW flip-flop 142 is driven to alternate states for each successive character. Control is exercised by CH flip-flop 121 which, in the middle of the final incoming stop element, alternately sets and clears SW flip-flop 142 for each successive incoming character. The function of SW flip-flop 142 is to provide a reversible alternate pattern of no delay and the greater incremental delay for signal element transitions to provide wide and narrow pulse distortion for successive characters.

Gates G1 and G3 are controlled by ST flip-flop 132, SW flip-flop 142, and gate G0, and functions to apply appropriate distortion delay signals to gates G2 and G4 at appropriate times so that each start pulse has the first incremental delay and subsequent element transitions have alternately no delay or the greater incremental delay. Since the delay of subsequent element transitions of each character are alternately less and greater than the start pulse delay, these transitions are thus advanced and retarded in time with respect to the start pulse. Under control of SW flip-flop 142, the initial transition of the element may be advanced and the terminal transition retarded to widen the pulse and, alternatively, the initial transition may be retarded and the terminal transition advanced to narrow the pulse.

As previously described, incoming start-stop character signals constitute eleven binary signal elements comprising a start element, eight information elements, and two stop elements. A representative signal wave showing successive characters is disclosed in FIG. 2 and identified as "SIGS IN." The initial portion of the wave is in the high condition and may comprise an idle line condition or the stop element of the prior character. At point 201 the new character commences with a negative going transition which is the initial portion of the start element. The eight information elements and the two stop elements then follow, succeeded by the start element of the next character.

Referring again to FIG. 1, the incoming signals are applied to inverter 102 and the inverted signals at the output thereof are applied to inverter 103 and to the enabling lead of pulsing gate 105. With the output of inverter 103 connected to the enabling lead of pulsing gate 104, the re-inverted signals are applied to gate 104 concurrently with the application of the inverted signals to gate 105. Thus, an incoming marking or high condition applies a correspondingly high condition to pulser gate 104, thereby enabling the gate while an incoming spacing condition produces the application of a high condition to gate 105, thereby enabling the latter gate.

The input pulsing leads to gates 104 and 105, which leads extend to the gates to a position adjacent to the dot therein, are connected to lead 106. As described hereinafter, a scanning pulse is applied to lead 106 at the theoretical midpoint of each signal element. Accordingly, gates 104 and 105 pass the scanning pulse when the incoming signal is marking and spacing respectively. With the outputs of gates 104 and 105 connected to the set and clear inputs, respectively, of IN flip-flop 107, the flip-flop is thus set by the scanning pulse when the incoming signal is marking and cleared by the scanning pulse when the incoming signal is spacing. The input start-stop signal is thus scanned by gates 104 and 105, and the corresponding conditions of the input signal are passed to IN flip-flop 107. The "1" output terminal of IN flip-flop 107 follows the incoming signal with a one-half element delay, providing a wave as shown in FIG. 2 and identified as "IN FF."

The output of inverter 102 also extends to the input pulsing lead of gate 120. The output of gate 120 is in turn connected to the input set lead of CH flip-flop 121. In the initial condition, CH flip-flop 121 is in the clear condition of the "0" output terminal thereof applies a high condition to the enabling lead of pulser gate 120. Since the initial negative transition of the start signal is inverted by inverter 102, a positive going transition is applied to the input pulsing lead of gate 120. This positive transition is passed through gate 120 and to set CH flip-flop 121. Accordingly, the "1" output terminal thereof goes to the high condition as shown by transition 202 in wave "CH '1.' "

The "1" output terminal of CH flip-flop 121 is connected to the reset terminal of element time counter 124 by way of diode 122 and the reset terminal of character time counter 125 by way of diode 123. In the initial condition the "1" terminal of CH flip-flop 121 is low, as previously described, and this low condition is passed to the reset terminals of counters 124 and 125, disabling the counters and holding them in the initial count condition. Upon the reception of the start transition, however, CH flip-flop 121 is set and the low condition at the "1" output terminal thereof is removed, thereby enabling counters 124 and 125. Accordingly, upon the reception of the start pulse transition, counters 124 and 125 are enabled and the clock pulses applied to counter 124 by clock 126 proceed to advance the counter.

As previously described, clock 126 produces one hundred clock pulses per signal element interval. Accordingly, after fifty clock pulses, the incoming start element is at the theoretical midpoint. At this point, element time counter 124 has advanced to the count of fifty, providing a pulse at the 50 output terminal thereof, which pulse is passed to lead 106. Thus, the start element, scanned by the pulse on lead 106 at the theoretical midpoint thereof, is stored in IN flip-flop 107 with the one-half element delay.

When element time counter 124 advances to the count of one hundred in response to one hundred clock pulses, it recycles to the initial count and concurrently advances character time counter 125. Since one hundred clock pulses correspond to the duration of a signal element, element time counter cycles during each incoming signal element interval and character time counter 125 is therefor advanced concurrently with the theoretical initiation of each new signal element. Accordingly, counter 124 advances to the count of 50 to generate scan pulses at the theoretical midpoints of each of the successive signal elements.

Counter 125 advances to the count of ten at the initiation of the last stop element of the character. With counter 125 at the count of ten, a positive condition is applied from the 10 output terminal thereof to the enabling lead of gate 127. Since the input pulsing lead of gate 127 is connected to the 50 output terminal of counter 124, a pulse passes therethrough to the clear input of CH flip-flop 121 at the theoretical midpoint of the last stop element of the incoming character. This restores CH flip-flop 121 to the clear condition and counters 124 and 125 are disabled and restored to the initial count condition, since the "1" output terminal of flip-flop 121 goes to the low condition, as can be seen at point 203 on wave "CH '1.'"

As previously described, character time counter 125 advances from the initial count to the count of one at the termination of the first or start element. In consequence thereof, the "1" output terminal thereof goes to the high condition and this positive transition is passed to the input pulsing lead of gate 130. The output of gate 130 is connected to the clear input of ST flip-flop 132. This flip-flop is initially in the set condition and the "1" output terminal is thus high as shown in wave "ST '1.'" Since the "1" output terminal is connected to the enabling lead of gate 130, the pulse applied by counter 125 to the pulsing lead is passed through the gate to clear ST flip-flop 132.

With ST flip-flop 132 in the clear condition, the high positive transition of the "0" output terminal thereof enables gate 131. The input pulsing lead of gate 131 is connected to the "0" output terminal of CH flip-flop 121. As previously described CH flip-flop 121 is cleared at the theoretical midpoint of the last stop element. Since this produces a positive transition in the "0" output terminal of CH flip-flop 121, which transition is passed by gate 131 to the set input of ST flip-flop 132, the latter flip-flop is thus set. Accordingly, ST flip-flop 132 is cleared at the termination of each incoming start element and set at the theoretical midpoint of the last stop element.

The "0" output terminal of CH flip-flop 121 is also connected to the input pulsing leads of gates 140 and 141, which gates are connected to the set and clear inputs respectively of SW flip-flop 142. Assuming that SW flip-flop 142 is initially in the set condition, the "1" output terminal thereof is in the high condition as shown in wave "SW '1.'" Gate 141 is thus enabled, passing the positive transition applied by the "0" output terminal of CH flip-flop 121 at the theoretical midpoint of the stop element. Accordingly, SW flip-flop 142 is cleared and the high condition at the "0" output terminal enables gate 140. With gate 140 enabled, the positive transition at the "0" output terminal of CH flip-flop 121 during the midpoint of the stop element of the next character sets SW flip-flop 142. Accordingly, SW flip-flop 142 is alternately set and cleared during the final stop element of successive characters.

Gate G0 provides the distortion delay pulses under the control of AND gates 134 and 135. AND gates 134 and 135 in turn are controlled by ST flip-flop 132 and element time counter 124.

The two inputs of AND gate 134 extend to the 65 output terminal of element time counter 124 and the "1" output terminal of ST flip-flop 132. It is recalled that ST flip-flop 132 is set from the middle of the last stop element of the incoming character to the end of the start element of the next successive character. Accordingly "1" output terminal of ST flip-flop 132 provides a high condition to one input of AND gate 134 during this interval. It is also recalled that element time counter 124 provides a positive pulse to output terminal 65 when the counter advances to the corresponding count of 65. Accordingly, AND gate 134 is enabled to pass a pulse during each start element, which pulse occurs 65 clock pulses after the initiation of the start element or 15 clock pulses after the scan pulse which reads the start element into IN flip-flop 107. Since each element interval corresponds to 100 clock pulses, the pulse passed by gate 134 therefore occurs when the start element is read into IN flip-flop 107 after a delay corresponding to 15 percent of the duration of the start element.

Considering now gate 135, one input thereof extends to the 80 terminal output of element time counter 124 and the other input is connected to the "0" output terminal of ST flip-flop 132. Since as previously described ST flip-flop 132 is cleared from the end of the incoming start element to the middle of the last stop element, one lead to AND gate 135 is maintained in the high condition during this interval by the "0" output terminal of flip-flop 132. In addition, as previously described, element time counter 124 provides a positive pulse to the 80 terminal output each time the counter advances to the count of 80. Since this occurs 30 clock pulses after the scan pulse, gate 135 is enabled to pass a pulse when each information element and the first stop element is read into IN flip-flop 107, which pulse has a delay relative to the scanning of the signal corresponding to 30 percent of the element interval.

The outputs of gates 134 and 135 are connected to inputs of OR gate G0. The output of OR gate G0, as seen as wave "G0" in FIG. 2, is a combination of the outputs of gates 134 and 135 and therefore comprises a 15 percent delay pulse occurring when the start element is read into IN flip-flop 107 and 30 percent delay pulses occurring when each scan information element and the first stop element is read into flip-flop 107. The output of gate G0 extends in parallel to inputs of gates G1 and G3.

Gates G1 and G3, in addition to being connected to gate G0, are controlled by ST flip-flop 132 and SW flip-flop 142 by way of gate 143. The inputs to AND gate 143 are connected to the "0" output terminals of SW flip-flop 142 and ST flip-flop 132. Accordingly, the output of gate 143 is high when both flip-flops are in the clear condition. It is recalled that ST flip-flop 142 is in the clear condition from the end of the incoming start element to the middle of the last stop element, and SW flip-flop 142 is in the clear condition for alternate characters and specifically from the middle of the last stop element of the preceding character to the middle of the last stop element of the alternate character. Accordingly, the output of gate 143 is in the high condition during the reception of the information elements and the first stop element of alternate characters which are received when SW flip-flop 142 is in the clear condition. Conversely, the output of AND gate 143 is in the low condition during the reception of all start elements and during the reception of the information elements and the stop element of the alternate characters which are received when flip-flop 142 is set.

One input to OR gate G1 is connected to the OR gate 143. The other input to OR gate G1 is connected to the output of gate G0, as previously described. Accordingly, the output of OR gate G1 is high when the output of gate 143 is high and passes the output of gate G0 therethrough when the output of gate 143 is low. This output is shown as wave "G1" in FIG. 2. It is seen that during the interval that SW flip-flop 142 is set, gate G1 passes the 15 percent delay pulse during the start element and the 30 percent delay pulses during the information element and the first stop element. Thereafter, for the next character with SW flip-flop 142 cleared, gate G1 passes the 15 percent distortion pulse during the start element but is thereafter maintained in the high condition for the remaining portion of the start-stop character.

The output of OR gate G1 extends to one input of AND gate G2. The other input to AND gate G2 is connected to the "0" output terminal of IN flip-flop 107. As previously described, IN flip-flop 107 is cleared when a spacing signal is read into the flip-flop and the "0" output terminal goes to the high condition. Accordingly, gate G2 produces a high condition at the output thereof when a spacing signal has been read into IN flip-flop 107 and the output of OR gate G1 goes to the high condition.

Wave G2 in FIG. 2 shows the output of gate G2. This shows that, during the start element, the 15 percent distortion pulse at the output of gate G1 is passed therethrough since the start element concurrently stored in IN flip-flop 107 is always a spacing signal. During the information elements of the alternate character received when SW flip-flop 142 is set, the 30 percent distortion pulse produced at the output of gate G1 will be passed by gate G2 in the event that the corresponding information element in IN flip-flop 107 is spacing. During the information elements of the alternate character received when SW flip-flop 142 is in the clear condition, positive conditions at the "0" output terminal of IN flip-flop 107 corresponding to spacing signals are passed without delay through gate G2 since the output of gate G1 is maintained in the high condition. Accordingly, the output of gate G2 goes high in response to each spacing element with a 15 percent delay for all start elements, and alternately with no delay and with a 30 percent delay for spacing information elements of successive characters.

As previously described, one input to OR gate G3 is connected to the output of OR gate G0. The other input to gate G3 is connected to the output of AND gate 143 by way of inverter 144. It is recalled that the output of AND gate 143 goes high from the end of the start element to the middle of the last stop element of characters received while SW flip-flop 142 is cleared. Conversely, the output gate 143 is low during the reception of all start elements and for the characters received while SW flip-flop 142 is set. Accordingly, the output of inverter 144 is high for all start elements and for characters received while flip-flop 142 is set, and low from the end of the start element to the middle of the last stop element of characters received while flip-flop 142 is cleared.

OR gate G3 passes the high condition at the output of inverter 144 during all start elements and alternate characters received while SW flip-flop 142 is set, and passes the delay pulses provided the output of OR gate G0 while the output of inverter 144 is low during the information elements and the first stop element of alternate characters received while SW flip-flop 142 is in the clear condition. This is shown in wave G3.

The output of OR gate G3 extends to one input of AND gate G4. The other input of AND gate G4 is connected to the "1" output terminal of IN flip-flop 107. Since as previously described, IN flip-flop 107 is set in response to the scanning of each marking element, a high condition is thus produced at the "1" output terminal. This high condition is passed to gate G4. Accordingly, gate G4 produces a high condition at the output thereof, as seen in wave "G4" in FIG. 2, when a marking signal is read into IN flip-flop 107 and the output of gate G3 goes to the high condition. Thus, the 30 percent distortion pulse produced at the output of gate G3 will be passed by gate G4 when there is read into IN flip-flop 107 a marking element or the first stop element of characters received while SW flip-flop 142 is cleared. With respect to characters received while flip-flop 142 is set, the positive conditions at the "1" output terminal of IN flip-flop 107 corresponding to scanned mark elements are passed without delay through gate G4 since the output of gate G3 is maintained in the high condition.

The outputs of gates G2 and G4 are connected to the input pulsing leads of gates 111 and 110, respectively. The outputs of gates 110 and 111 extend to the input set and clear terminals, respectively, of OUT flip-flop 112. The "1" output terminal of flip-flop 112 is connected to output lead 113 and the enabling lead of gate 111. The "0" output terminal of flip-flop 112 is connected to the enabling lead of gate 110.

OUT flip-flop 112 is initially in the set condition corresponding to the idle marking condition. With the flip-flop set, the "1" output terminal is high and output lead 113 has a marking high condition applied thereto as shown in portion 205 of wave "SIGS OUT" in FIG. 2. In addition, the high condition at the "1" output terminal enables gate 111.

Assuming now that a character is received with SW flip-flop 142 in the set state, gate G2 passes a positive pulse to gate 111 with a delay of 15 percent after the start transition is scanned, as previously described. This pulse is passed by gate 111, clearing OUT flip-flop 112. The "1" output terminal goes low producing a transition 206 as shown in wave "SIGS OUT." The low signal comprises the spacing start element delayed by 15 percent. With flip-flop 112 clear, gate 110 is now enabled.

The "spacing" clear condition of flip-flop 112 is maintained until a marking element is read into IN flip-flop 107 and a high condition is produced at the output of gate G4. Since SW flip-flop 142 is set, the condition is passed by gate G4 without delay. Thus, assuming that the first intelligence element is a marking bit, gate G4 passes a pulse through gate 110 with no delay after the bit is scanned whereby OUT flip-flop 112 is set and a high condition is applied to output lead 113 producing transition 207 on wave "SIGS OUT."

The "marking" set condition of flip-flop 112 is maintained until a spacing element is read into IN flip-flop 107 and a high condition is produced at the output of gate G2. Since SW flip-flop 142 is set, the high condition is passed by gate G2 with a 30 percent delay. Thus, assuming that the second intelligence element is a spacing bit, gate G2 passes a pulse through gate 111 with a 30 percent delay after the bit is scanned whereby OUT flip-flop 112 is cleared and a low condition is applied to output lead 113 producing transition 208 on wave "SIGS OUT."

In a similar manner, for the remaining portion of the character, each subsequent mark-to-space transition read by IN flip-flop 107 is passed to OUT flip-flop 112 with a 30 percent delay and each subsequent space-to-mark transition read by flip-flop 107 is passed to OUT flip-flop 112 with no delay. With the start element transition delayed 15 percent, the relative distortion of subsequent space-to-mark transitions simulates an advance of 15 percent since the transitions have no delay and the relative distortion of space-to-mark transitions simulates a delay of 15 percent since these transitions have an absolute delay of 30 percent. Thus, the leading edges of mark bits are advanced, the trailing edges are delayed and the marking elements are widened.

With respect to a character received with SW flip-flop 142 in the clear state, gate G2 passes the initial pulse corresponding to the start element after a 15 percent delay in the same manner as previously described. OUT flip-flop 112 is thus cleared and lead 113 goes to the low condition producing transition 210 as shown in wave "SIGS OUT."

Assuming that the first intelligence element is marking, with SW flip-flop 142 in the clear state, gate G4 now passes a pulse through gate 110 with a 30 percent delay after the bit is scanned whereby OUT flip-flop 112 is set and a high condition applied to lead 113 producing transition 211 on wave "SIGS OUT."

Assuming that the second intelligence element is spacing, with SW flip-flop 142 in the clear state, gate G2 now passes a high condition through gate 111 with no delay after the bit is scanned whereby OUT flip-flop 112 is cleared and a low condition applied to output lead 113 producing transition 212 on wave "SIGS OUT."

In a similar manner for the remaining portion of the character, each subsequent mark-to-space transition is passed to OUT flip-flop 112 with no delay and each subsequent space-to-mark transition is passed with a 30 percent delay. With the start transition delayed 15 percent, the relative distortion of subsequent mark-to-space transitions simulates an advance of 15 percent since the transitions have no delay and the relative distortion of subsequent space-to-mark transitions simulates a delay of 15 percent since these transitions have an absolute delay of 30 percent. Thus the leading edges of mark bits are delayed, the trailing edges are advanced, and the marking elements are narrowed.

What is claimed is:

1. In a set for distorting signal element characters, a source of undistorted signal element characters,
a signal receiver,
means responsive to said signal source for applying without delay said undistorted signals to said signal receiver,
means for delaying said application of said signals to said receiver for a predetermined interval,
means for delaying said application of said signals to said receiver for a prolonged interval exceeding in duration said predetermined interval,
and means for enabling said predetermined interval delay means to apply only a first one of said signal elements of each character to said receiver and for enabling said prolonged interval delay means to apply only certain ones of the subsequent signal elements of the character to said receiver,
whereby said certain subsequent signal elements are retarded in phase and other subsequent signal elements are advanced in phase relative to said first signal element.

2. In a set for distorting transitions of binary signal element characters,
a signal source for producing undistorted binary signal element characters,
a signal receiver,
means responsive to said signal source for applying without delay transitions of said produced signal elements to said signal receiver,
timing means responsive to the production of the initial signal element transition of said character of said signal source for generating a first delay signal an incremental interval after said source produces said initial transition and for generating a second delay signal a prolonged interval, exceeding in duration said incremental interval, after said source produces each subsequent transition in said character after said initial transition,
and means responsive to said first and second delay signals for delaying said application of only said initial signal element transition to said receiver for said incremental interval and for delaying said application of only certain ones of said subsequent signal element transition for said prolonged interval,
whereby the certain transitions of said subsequent elements of said character are retarded in phase and the other transitions of said subsequent elements are advanced in phase relative to said initial transition.

3. In a set for distorting transitions of binary signal element characters in accordance with claim 2,
wherein said delaying means for delaying subsequent certain ones of said signal element transitions delays only said certain transitions corresponding to the leading edge of said elements,
whereby said leading edge of said element is delayed and the trailing edge of said element is advanced in phase relative to said initial transition and said element is narrowed.

4. In a set for distorting transitions of binary signal element characters in accordance with claim 2,
wherein said delaying means for delaying subsequent certain ones of said signal element transitions delays only said certain transitions corresponding to the trailing edge of said elements,
whereby said leading edge is advanced and said trailing edge is delayed in phase relative to said initial transition and said element is widened.

5. In a set for distorting transitions of binry signal element characters in accordance with claim 2,
wherein said delaying means includes means for delaying only said subsequent certain ones of said signal element transitions corresponding to the leading edge of said elements,
means for delaying only said subsequent certain ones of said signal element transitions corresponding to the trailing edge of said elements,
and means for alternately enabling said leading edge delaying means and said trailing edge delaying means during the production of successive characters by said source.

References Cited

UNITED STATES PATENTS

| | | | |
|---|---|---|---|
| 2,865,997 | 12/1958 | Gardberg ---------- | 178—69.2 |
| 3,323,111 | 5/1967 | Waghorne. | |

ALVIN H. WARING, Primary Examiner

M. M. CURTIS, Assistant Examiner

U.S. Cl. X.R.

328—162